May 3, 1966 D. H. SCOFIELD 3,249,704
ELECTRICAL CONDUCTOR BAR FOR TROLLEY
ELECTRIFICATION SYSTEMS
Filed June 18, 1963 4 Sheets-Sheet 1
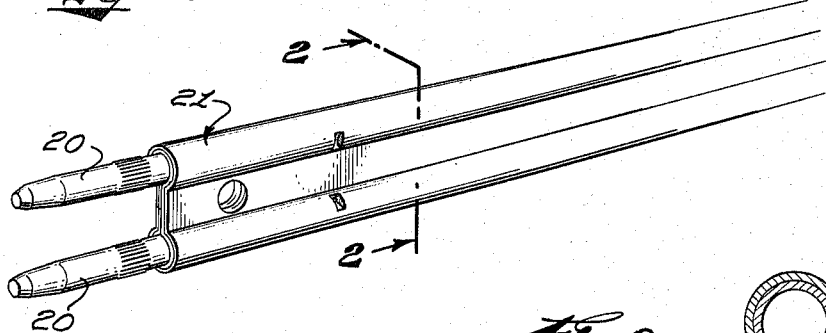
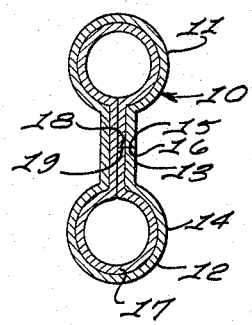
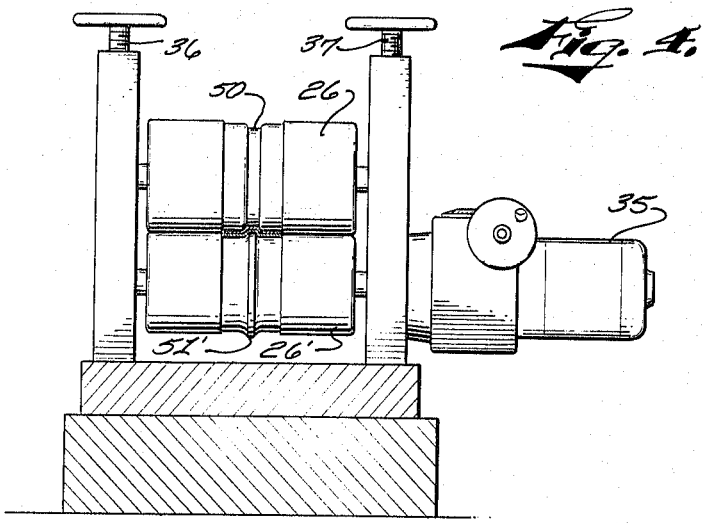
INVENTOR.
DONALD H. SCOFIELD
BY
FOWLER & KNOBBE
ATTORNEYS May 3, 1966
D. H. SCOFIELD
3,249,704
ELECTRICAL CONDUCTOR BAR FOR TROLLEY
ELECTRIFICATION SYSTEMS
Filed June 18, 1963
4 Sheets-Sheet 2
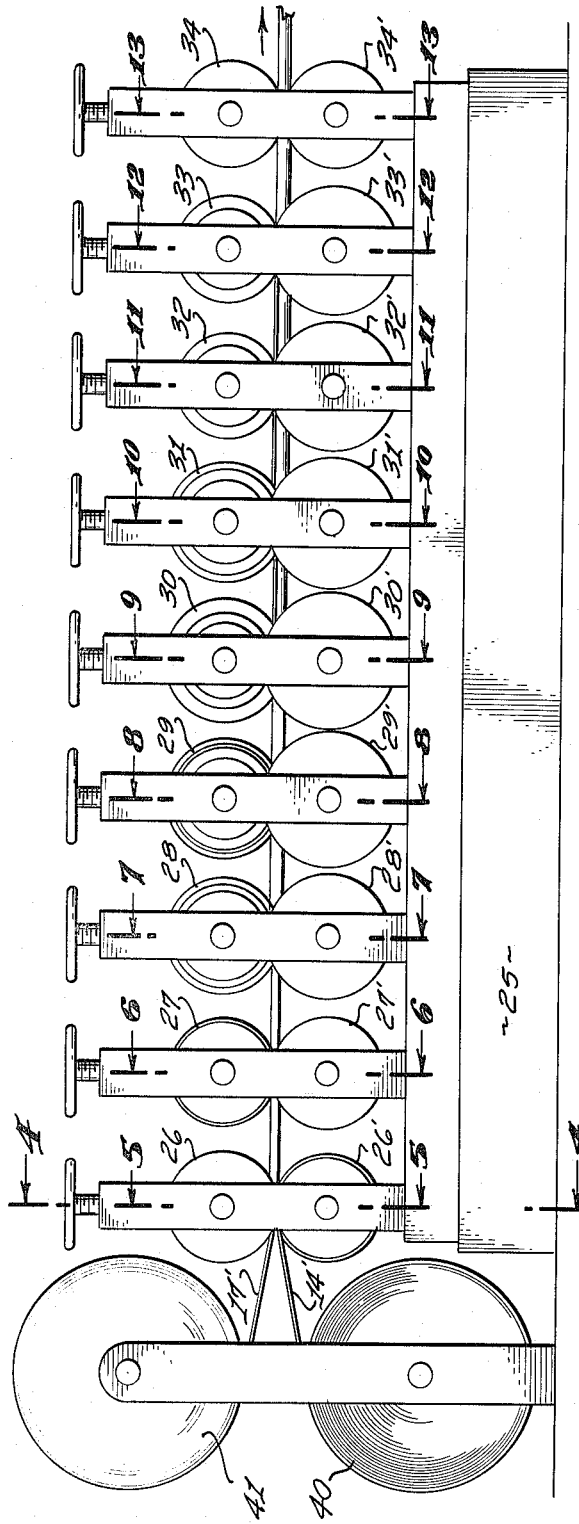
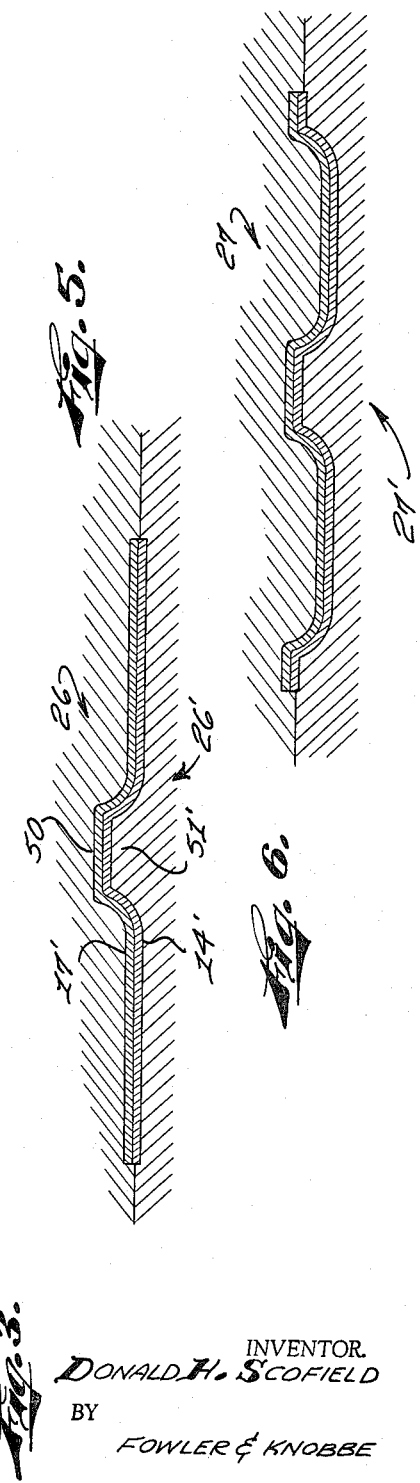
INVENTOR.
DONALD H. SCOFIELD
BY
FOWLER & KNOBBE
ATTORNEYS

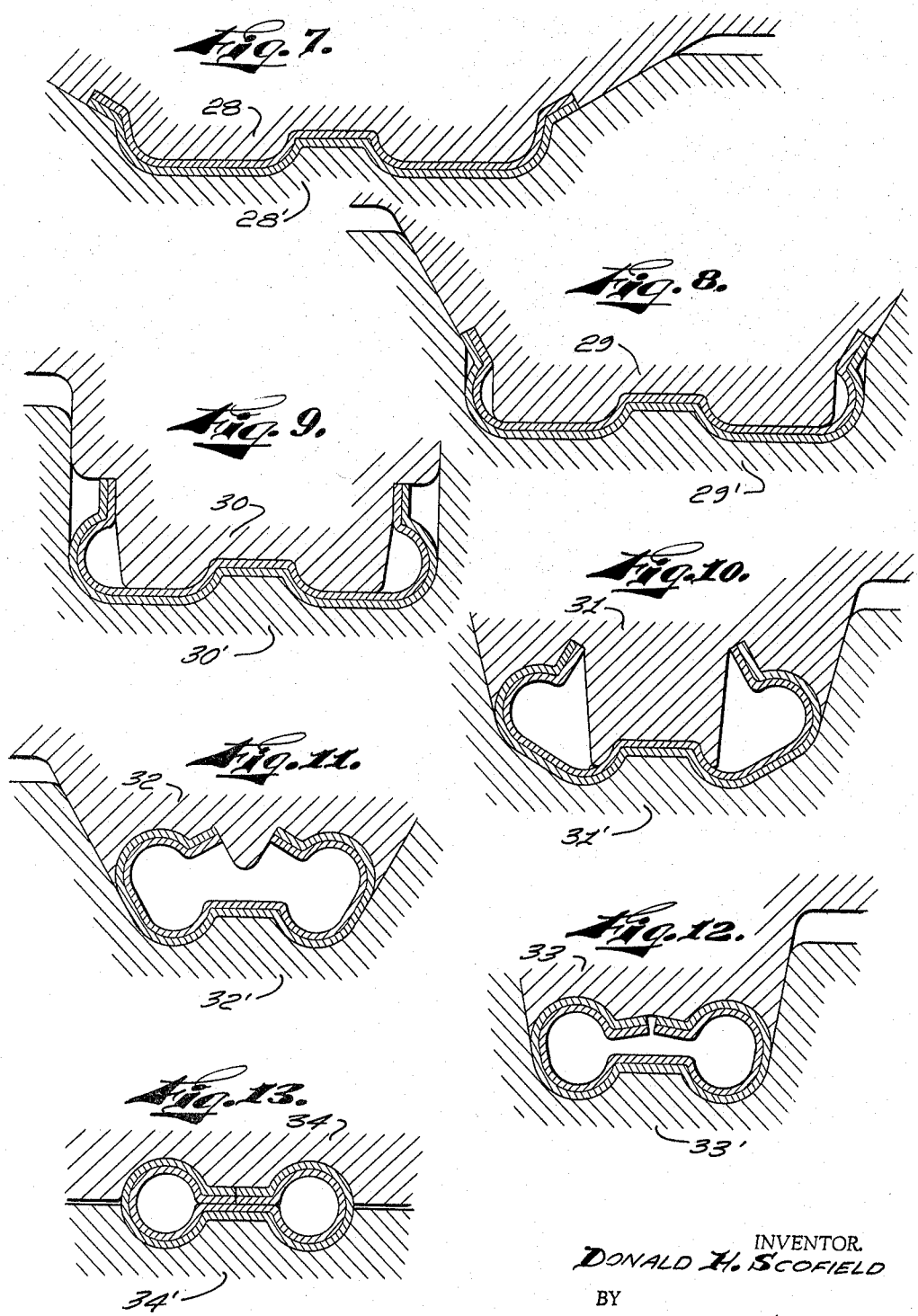

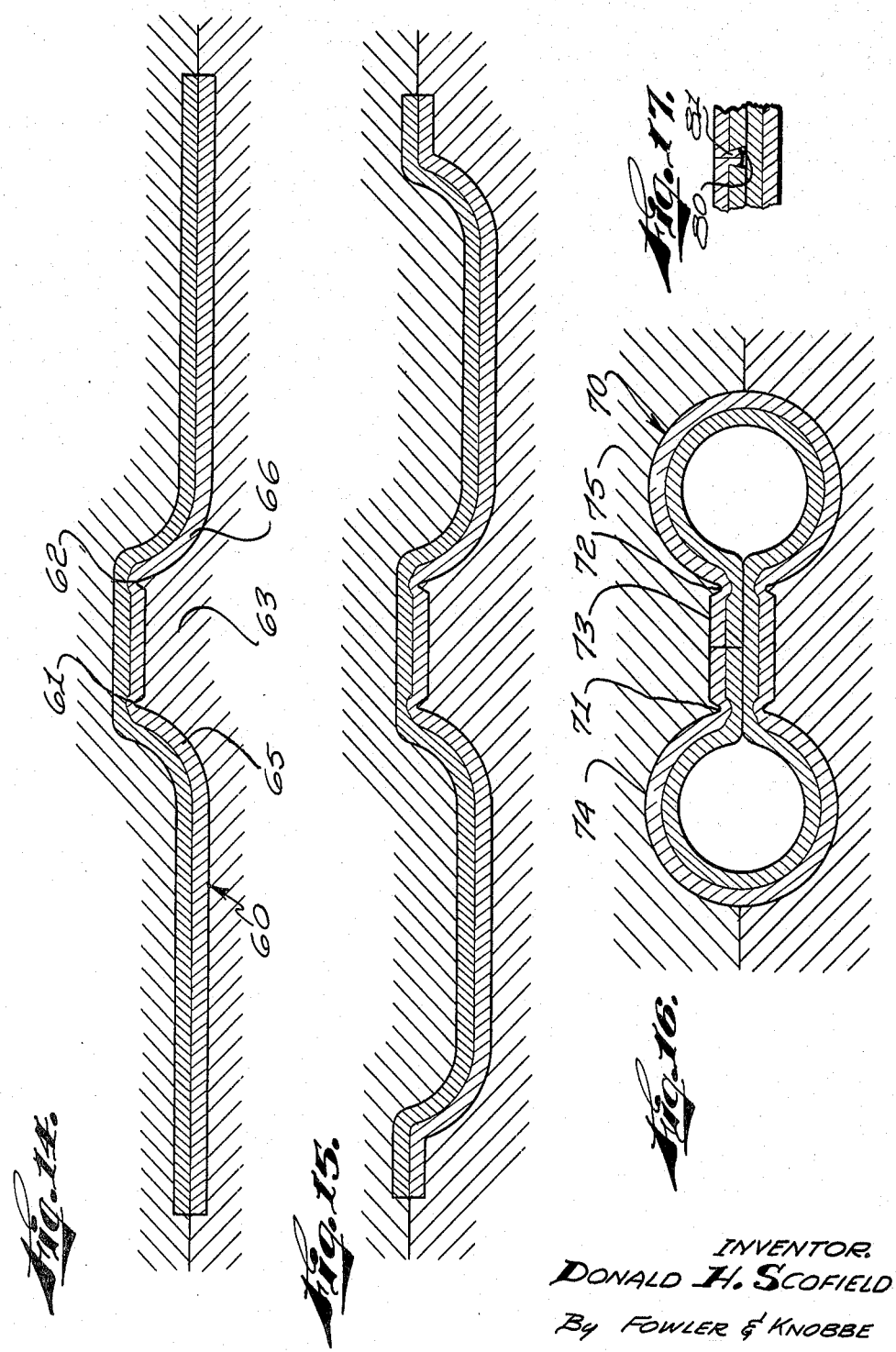

United States Patent Office 3,249,704
Patented May 3, 1966

3,249,704
ELECTRICAL CONDUCTOR BAR FOR TROLLEY ELECTRIFICATION SYSTEMS
Donald H. Scofield, Redwood City, Calif., assignor to Insul-8 Corp., San Carlos, Calif., a corporation of California
Filed June 18, 1963, Ser. No. 288,734
4 Claims. (Cl. 191—33)

This application is a continuation-in-part of application Serial No. 266,574, filed March 20, 1963, and now abandoned.

The present invention relates to an improved electrical conductor bar and method for making a conductor bar particularly adapted for use in elevated trolley electrification systems wherein electrical power is to be supplied to mobile machinery.

A representative mobile machine is the electrical hoist mounted upon a carriage suspended on wheels which roll along a supporting track or rail. Usually, one or more conductor bars are supported from and extend along the rail, and a corresponding number of electrical collectors are mounted on the carriage and held in engagement with the conductor bars as the carriage moves along the rail. These conductor bars must be capable of carrying a substantial current, e.g., 200 amperes while occupying an area of only approximately 1 x 3/8 inch. Moreover, the conductor members must be sufficiently rigid to retain their configuration, be light in weight for facilitating elevated installation, have a hard surface to prevent undue wear from the collector member, and in many instances be resistant against corrosive atmospheres, moisture, salt spray, etc. Another important requirement is that the bar be inexpensive to manufacture.

A preferred configuration presently known in the art for conductor bar is that of a generally "figure 8" configuration of 1 x 3/8 inch dimension which comprises in cross-section a pair of spaced apart circular lobe portions joined by an integral web. By way of specific example, bars of this configuration have 90, 300 and 500 amperes, 600 volts A.C., 250 volts D.C. ratings when constructed respectively of galvanized steel strip, copper strip, and solid copper, the latter two bars costing appreciably more because of the substantially higher cost of copper over steel. There exists a need for a bar having a 200 ampere rating without the increased cost of the all-copper bar. One solution suggested heretofore is forming the bar from copper clad steel strip. This commercially available material is formed by casting copper around a steel billet and afterward working down to the required strip size. However, this material is quite expensive and offers no substantial cost savings over pure copper strip.

Another conductor bar known in the prior art employs a solid steel bar upon which is located a copper member covering all or a portion only of the solid steel bar. This type of bar has been traditionally employed as the third rail conductor for electrical railways. Their substantial weight, however, makes them completely unsuited for elevated trolley electrification systems. Such conductors are exemplified by the following U.S. Patents: Nos. 283,760; 689,615; 1,101,579; and 1,620,496.

It is the object of the present invention to provide an improved electrical conductor and method for making such conductor which provides a satisfactory solution for each of the enumerated requirements.

Another object of the present invention is to provide a light weight conductor bar and method for making the bar which has both a low electrical resistance and substantial rigidity and durability.

A further object of the invention is to provide a relatively inexpensive bar and method for making the bar which has the low electrical resistance of copper and the high moduli of elasticity and rigidity of steel and like metals.

Other further objects, features and advantages of the invention will become apparent as the description proceeds.

Briefly, in accordance with a preferred form of the present invention, there is provided a conductor bar of extended lengths formed of a sheet of copper and a sheet of steel in face-to-face contact. These sheets are roll-formed together under pressure into at least one and preferably two hollow circular lobes, the rolling operation also serving to remove the oil and moisture from the contacting surfaces by a squeezing action. It has been discovered that this operation produces a pressure bond between the copper and steel which allows the current to flow readily between the copper and steel members. In other words, the transfer resistance between the sheets is uniformly low so that the conductivity of the composite conductor bar is comparable to the sum of its parts.

A significant feature of the invention is that the steel and copper sheets are initially separate members, i.e., no prebonding of these members, either by precasting and working or by welds, adhesives or other bonding media is necessary. The method of the invention is therefore quite simple to perform and produces an inexpensive and highly commercially feasible conductor bar. Moreover, the resulting conductor bar is a hollow, lightweight member having both a low electrical resistance and substantial rigidity offering both a substantial saving in cost and weight over the prior art configurations.

Although the invention is not limited to a corrosion resistant conductor bar, it finds particular application thereto since the outer member may be selected from a stainless, Monel or galvanized steel material. Ordinarily, these materials are unsuited for high ampere capacity conductors because of their relatively high electrical resistance.

A more thorough understanding of the invention may be obtained by a study of the following detailed description taken in connection with the accompanying drawings in which:

FIG. 1 is a perspective view of a preferred embodiment of electrical conductor bar constructed according to the invention;

FIG. 2 is a cross-sectional view taken along lines 2—2 of FIG. 1;

FIG. 3 is a side elevation view of a cold roll forming apparatus suitable for performing the method of the invention;

FIG. 4 is a view, partially in cross-section, taken along lines 4—4 of FIG. 3;

FIGS. 5 through 13 are respective cross-sectional views taken along the lines 5—5 through 13—13 of FIG. 3 showing the successive roll forming dies used for forming the embodiment of FIG. 1;

FIGS. 14, 15 and 16 illustrate modified embodiments of roll forming dies; and

FIG. 17 illustrates a modified conductor bar.

Referring now to FIGS. 1 and 2, the electrical bar 10 comprises in cross-section a pair of generally circular lobe portions 11, 12 which are spaced apart and joined by an integral web 13. This generally "figure 8" configuration is preferred for trolley electrification systems since it has substantial bending resistance without excessive weight. Furthermore, a smooth outwardly directed convex surface is provided for engagement by the sliding electrical contact.

Adjacent lengths of conductor bar are retained together by means of pins 20 inserted in each of the conductor bar lobes of a length 21 of a conductor bar. These pins in turn are inserted into corresponding lobes of the adjacent section of conductor bar. These pins are formed of copper or steel depending upon whether they are in direct contact with copper or steel surfaces, as described below.

The structural members 11, 12 and 13 include an outer member 14 extending continuously between juxtaposed ends 15, 16 and an inner member 17 closely abutting member 14 and extending continuously between juxtaposed ends 18, 19.

In one embodiment of the invention, the outer member is formed of a material having a relatively high modulus of elasticity of the order of 28 to 31 ($10^6$) p.s.i. and a relatively high modulus of rigidity of the order of 11 ($10^6$) p.s.i. Structural and alloy steels are preferred materials for this member. Stainless, Monel and galvanized steels are required for conductor bars which are to be used in corrosive atmospheres. In this embodiment, the inner member 17 is formed of a material having a substantially lower electrical resistance than the outer member. Copper is a particularly desirable material for this member, this material having a resistivity of the order of 1.7 ($10^{-8}$) ohm-meters compared with a resistivity of the order of 22 ($10^{-8}$) ohm-meters for steel. Aluminum also may be employed, this material having a resistivity of about 2.8 ($10^{-8}$) ohm-meters. Both of these materials, however, have substantially lower moduli of elasticity and rigidity than steel, their comparative physical characteristics being listed in the table below:

Table I

| Material | Modulus of Elasticity (p.s.i.×$10^6$) | Modulus of Rigidity (p.s.i.×$10^6$) | Resistance ohm×$10^{-8}$ |
|---|---|---|---|
| Steel | 28–31 | 11 | 22 |
| Copper | 16–17 | 6 | 1.7 |
| Aluminum | 10 | 4 | 2.8 |

A significant advantage of the invention is that the resulting electrical conductor bar exhibits a low impedance of the order of 2–3 ohm-meters and moduli of elasticity and rigidity of the order of 30 ($10^6$) p.s.i. and 11 ($10^6$) p.s.i., respectively.

In another and preferred embodiment of the invention, the outer member 14 is formed of copper and the inner member 17 of steel. This bar provides a lightweight conductor bar having both a low electrical resistance and high rigidity and the additional advantages of high corrosion resistance and a very low electrical resistance path between the bar and the movable electrical collector.

In both embodiments described above, the copper strip is preferably work hardened to the hardness denoted as half-hard in the copper industry. Half-hard copper is copper whose thickness has been reduced by cold rolling some 15% to 20%. It has a range of 60 to 66 on the 30–T Rockwell scale and a tensile strength of between 57,000 and 67,000 p.s.i. This tensile strength is sufficient to enable the copper strip to exert a substantial confining action upon the steel when the former is used as the outer conductive member. Three quarter hard and harder grade coppers have been found to be objectionable because of their tendency to crack at the small radii bends of the "figure 8" configuration. Softer grade coppers may be employed in the first described embodiment because of the confining action of the outer steel covering. However, quarter hard and softer grade copper strip material has a tendency to separate from the steel member when the copper is on the outside.

Also, the thickness of the copper strip material is determined in part by the embodiment chosen and the desired ampere rating. A suitable bar having a 170 ampere rating utilizes a 0.02 inch inner copper member and a 0.04 inch outer steel member. Since copper material this thin tends to separate from the steel material when the copper forms the outer member, the outer member is preferably of the order of 0.03 inch thick. Copper strip of this thickness in combination with an inner 0.03 inch steel member provides a conductor bar having a 200 ampere rating. Thicker copper members with associated thinner steel members may be utilized also, the resulting bars having a correspondingly higher ampere rating.

FIGS. 3 through 13 illustrate the method for manufacturing the conductor bar of the invention. Referring now to FIG. 3, there is shown a cold roll forming apparatus comprising a common bed 25 supporting nine pairs of forming rolls, 26, 26'; 27, 27'; 28, 28'; 29, 29'; 30, 30'; 31, 31'; 32, 32'; 33, 33'; and 34, 34' respectively shown in cross-sectional detail in FIGS. 5 through 13. The bottom rolls, 26' through 34' are driven at progressively increasing rotational velocity to maintain the conductor bar under continuous tension during the forming process. By way of specific example, the first roll, 26', may be operated at 50 r.p.m., the second roll, 27', at 51 r.p.m., with like one r.p.m. increments for the succeeding roll. A representative view of one of the drive members is shown in FIG. 4 wherein the variable speed drive 35 is connected in driving relationship with bottom roll 26'. Another embodiment (not shown) which achieves the same result is a cold forming apparatus wherein the rolls have increasingly small diameters but are all operated at the same rotational velocity.

Each pair of rolls includes means for varying the space between the upper roll and the lower roll and thereby varying the pressures applied which may comprise, as shown in FIG. 4, respective lead screws 36, 37 adapted upon rotation, to translate opposite ends of the upper roll 26 along a vertical axis.

Large rolls of strip material are retained on reels 40, 41. Reel 40 contains a continuous strip of material 14' for forming the outer member 14 of the finished conductor bar and reel 41 contains a continuous strip of material 17' for forming the inner member 17 of the finished conductor bar. Since the inner sheet 17' is confined within the outer sheet 14' in the circular lobe portions of the finished conductor bar, a sheet 17' is ordinarily used having a slightly narrower width than sheet 14' so that the respective edges of the members 15, 16 and 18, 19 meet in close juxtaposition as shown in FIG. 2. The finished bar is a hollow conductor bar of extended or unitary length limited only to the length of the strips of material on reels 40 and 41.

Each mating set of rolls has a predetermined cross-sectional configuration to cold form the strips 14', 14' in the appropriate manner. FIGS. 5–13 illustrate the shape of each pair of rolls. Thus, as shown in FIG. 5, the first set of rolls, 26, 26' has an annular groove 50 in roll 26 and a mating annular ring 51 in roll 26'. These rolls apply sufficient pressure to members 14', 17' to remove substantially all of the oil and moisture from their contacting metal surfaces and thereby obtain an excellent electrical bond (low transfer resistance) therebetween. After the initial rolling action, the succeeding mating rolls shown in FIGS. 6 through 13 form, by successive rolling operations, a pair of lobes wherein the inner strip is closely confined by the outer strip. It has been discovered that forming the metal layers together in the manner described wherein an inner member is substantially enclosed by an outer member maintains the requisite intimate metal-to-metal bond necessary for a low resistance electrical conductor bar. The metal-to-metal bond is augmented by the connector pins 20 which contribute additional pressure between the inner and outer members at the respective ends of the conductor bars.

The bond between the two metal sheets is further enhanced by forming the bar with the set of roll forming dies illustrated in FIGS. 14, 15 and 16. Referring now to FIG. 14, the bottom roll 60 includes a pair of annular ridges 61, 62 adjacent the edges of the annular ridge 63. These ridges extend on the order of 0.01 inch above the surface of the ridge 63 when used with sheet stock 0.03 inch thick. As shown, these ridges provide a crimping action whereby the arcuate portions 65, 66 of the outer member are stretched around the inner member as the lobes are formed in the successive rolling operations. The ridges 61, 62 of roll 63 are preferably included on all bottom rolls of each succeeding set of rolls, the second of which is shown by way of example, in FIG. 15. In the final rolling step, shown in FIG. 16, the upper roll 70 is provided with a like pair of annular ridges 71, 72 at the edges of the flat surface 73 joining the annular grooves 74, 75. These ridges 71, 72 also stretch the material of the outer member over the respective lobe portions of the inner member. It has been found that these crimping operations are particularly advantageous when the outer member is formed of copper since the softer outer copper member is stretched over the harder inner steel member and tightly locked thereto at the respective crimps or depressions formed by the ridges upon the rolling dies.

FIG. 17 illustrates a modified form of the conductor bar described hereinabove wherein the outer copper member is made sufficiently wide to slightly overlap the steel at one or preferably both juxtaposed edges forming the joint of the web portion. On the last rolling operation, these overlapping edges are forced down into the gap 80 separating the respective edges of the inner steel member as shown at 81. This further locks the outer copper strip to the inner steel member, thereby obviating any tendency of the copper to separate from the steel at the joint.

Although exemplary embodiments have been disclosed and discussed, it will be understood that other applications of the invention are possible and that the embodiments disclosed may be subjected to various changes, modifications and substitutions without necessarily departing from the spirit of the invention.

I claim:
1. For use in trolley electrification systems, a lightweight electrical conductor bar of extended length having at least one hollow lobe portion and a web integral therewith comprising, in combination,
 (a) an outer conductor member formed of a thin sheet of work hardened copper between one-quarter and three-quarter hard engageable by the collector of a trolley electrification system;
 (b) an inner conductor member formed of a thin sheet of steel in intimate contact with said copper sheet;
 (c) the copper sheet having a modulus of elasticity of the order of 10–17 ($10^6$) p.s.i. and an electrical resistance of the order of 1.5–3 ($10^{-8}$) ohm-meters, and the steel sheet having a modulus of elasticity of the order of 28–31 ($10^6$) p.s.i. and an electrical resistance of the order of 22 ($10^{-8}$) ohm-meters; and,
 (d) said sheet of copper being tensioned to exert a substantial confining action upon said inner conducting member and said sheet of steel being in compression to exert an outward pressure on said outer conducting member to maintain said sheets in face-to-face contact so that the transfer resistance therebetween is uniformly low without welding the sheets or using a bonding media therebetween.

2. A lightweight electrical conductor bar of extended length having at least one hollow lobe portion and a web integral therewith in accordance with claim 1 wherein the conductor members are maintained in intimate contact with each other over their entire surfaces, in part, by crimping the outer conductor member in the web portion adjacent said lobe portion.

3. A lightweight electrical conductor bar of extended length having at least one hollow lobe portion and a web integral therewith in accordance with claim 1 wherein the copper sheet is at least .03 inch thick.

4. For use in trolley electrification systems, a continuous length lightweight electrical conductor bar having a figure-eight configuration including a pair of hollow circular lobes joined by an integral web comprising, in combination,
 (a) an outer conductor member formed of a thin sheet of roll hardened copper between one-quarter and three-quarter hard and approximately .03 inch in thickness engageable by the collector of a trolley electrification system;
 (b) an inner conductor member formed of a thin sheet of steel in intimate contact with said copper sheet;
 (c) the copper sheet having a modulus of elasticity of the order of 10–17 ($10^6$) p.s.i., a modulus of rigidity of the order of 4–6 ($10^6$) p.s.i. and an electrical resistance of the order of 1.5–3 ($10^{-8}$) ohm-meters, and the steel sheet having a modulus of elasticity of the order of 28–31 ($10^6$) p.s.i., a modulus of rigidity of the order of 11 ($10^6$) p.s.i. and an electrical resistance of the order of 22 ($10^{-8}$) ohm-meters;
 (d) said sheet of copper being tensioned to exert a substantial confining action upon the inner conducting member and the sheet of steel being in compression to exert an outward pressure on the outer conductor member whereby the sheets are maintained in intimate contact to maintain a uniformly low transfer resistance therebetween without the use of a bonding media or welding; and,
 (e) a series of crimps formed in the webbed portion of the outer copper member adjacent the lobe portions to increase the confining action of the outer sheet with respect to the inner sheet and to maintain the outer and inner conductor members in contacting relation.

References Cited by the Examiner

UNITED STATES PATENTS

| | | | |
|---|---|---|---|
| 689,615 | 12/1901 | Heyl-Dia | 191—33 |
| 1,101,579 | 6/1914 | Steinberger | 191—33 |
| 2,311,138 | 2/1943 | Swartz | 174—126.2 |
| 2,498,357 | 2/1950 | Breisch | 174—126.2 X |
| 2,596,375 | 5/1952 | Daniels | 29—509 |
| 2,601,029 | 6/1952 | King | 29—509 |
| 2,677,765 | 5/1954 | Collins et al. | 174—133 |
| 2,741,498 | 4/1956 | Elliott | 29—521 |
| 2,839,621 | 6/1958 | Boldt | 191—33 |
| 2,852,843 | 9/1958 | Banta et al. | 29—521 X |
| 3,009,484 | 11/1961 | Dollens. | |
| 3,100,930 | 8/1963 | Mihlen et al. | 29—521 X |

FOREIGN PATENTS

| | | |
|---|---|---|
| 687,257 | 1/1940 | Germany. |
| 70,654 | 7/1946 | Norway. |

EUGENE G. BOTZ, *Primary Examiner.*

LARAMIE E. ASKIN, *Examiner.*

J. F. RUGGIERO, *Assistant Examiner.*

UNITED STATES PATENT OFFICE

CERTIFICATE OF CORRECTION

Patent No. 3,249,704                      May 3, 1966

Donald H. Scofield

It is certified that error appears in the above identified patent and that said Letters Patent are hereby corrected as shown below:

Column 5, line 57 and column 6, line 25, for "10-17", each occurrence, read -- 16-17 --.

Signed and sealed this 1st day of July 1969.

(SEAL)
Attest:

Edward M. Fletcher, Jr.
Attesting Officer

WILLIAM E. SCHUYLER, JR.
Commissioner of Patents